Oct. 10, 1967 J. E. SCOTT ETAL 3,346,844

BINARY CODED SIGNAL CORRELATOR

Filed June 9, 1965

INVENTORS
JOHN E. SCOTT
TEDDY R. THOMAS
BY
S. C. Yeaton
ATTORNEY

United States Patent Office 3,346,844
Patented Oct. 10, 1967

3,346,844

BINARY CODED SIGNAL CORRELATOR

John E. Scott, Rego Park, N.Y., and Teddy R. Thomas, Houston, Tex., assignors to Sperry Rand Corporation, Great Neck, N.Y., a corporation of Delaware Filed June 9, 1965, Ser. No. 462,490
9 Claims. (Cl. 340—146.2)

This invention relates to a system for comparing binary coded words and more specifically to a device for comparing an unknown binary coded word simultaneously with a plurality of stored words.

It frequently becomes necessary to compare an unknown coded word with a number of stored coded words and to indicate the particular stored word which most closely resembles the unknown word.

In data transmission, for instance, a noisy coded word must sometimes be correlated with various message codes in order to determine the message that was originally transmitted.

Similarly, in digital pulse compression radar, a coded return word is often correlated with the transmitted coded word and with the Doppler shifted variations of the transmitted word to provide a simultaneous indication of both range and velocity of the target.

Known methods of performing such correlations usually require the use of highly accurate tapped delay lines for analogue processing. Direct digital methods for performing this function involve complex circuits. Such complex circuits are expensive to fabricate and difficult to maintain.

It is an object of the present invention to provide a binary coded correlator that does not require the use of a tapped delay line.

It is another object of the present invention to provide a binary coded correlator that requires a minimum number of circuit components.

These and other objects are achieved by comparing the individual digits of an incoming binary coded word simultaneously with the corresponding digits of each of a number of stored words, and then providing an output signal corresponding to any stored word in which more than a predetermined number of digits agree with the corresponding digits in the incoming word.

The principles and operation of the invention may be understood by referring to the following description and the accompanying drawings in which.

The signal correlator of the present invention consists essentially of an $m$-stage shift register, a set of gates and drivers, and a coded memory.

Many types of coded, read-only memories that are known to the art may be used in practicing the invention. Patent No. 3,130,388 issued to A. M. Renard on Apr. 21, 1964, and assigned to the present assignee, for instance, concerns an eddy current type memory that could be used for this purpose.

A variety of read-only memories suitable for this purpose is described in the article, "A Short Review of Read-Only Memories," by D. M. Taub, appearing on pages 157–165 of the Proceedings of the Institution of Electrical Engineers (Great Britain), volume 110, No. 1, for January 1963. Thus capacitive, inductive, optical, or magnetic coupling may be employed between each drive line and each output line in the memory.

The presently preferred memory, however, is of the eddy current type. A drive wire is inductively coupled to a sense wire at each bit position. A metallic memory card is positioned in a plane adjacent the plane of these bit positions. Binary information is entered into the memory by forming apertures in the metallic card adjacent those positions in which a binary ONE is to be stored. A pulse of drive current can be coupled to a sense wire wherever an aperture has been formed at the appropriate bit position. At the bit positions having no aperture however, a pulse of drive current induces eddy currents in the metallic card. These set up a counter E.M.F. in the sense wire strong enough to cancel the E.M.F. induced directly into that sense wire. Thus, no net signal is produced in the sense wire at those bit positions at which a binary ZERO is stored.

Figure 1:
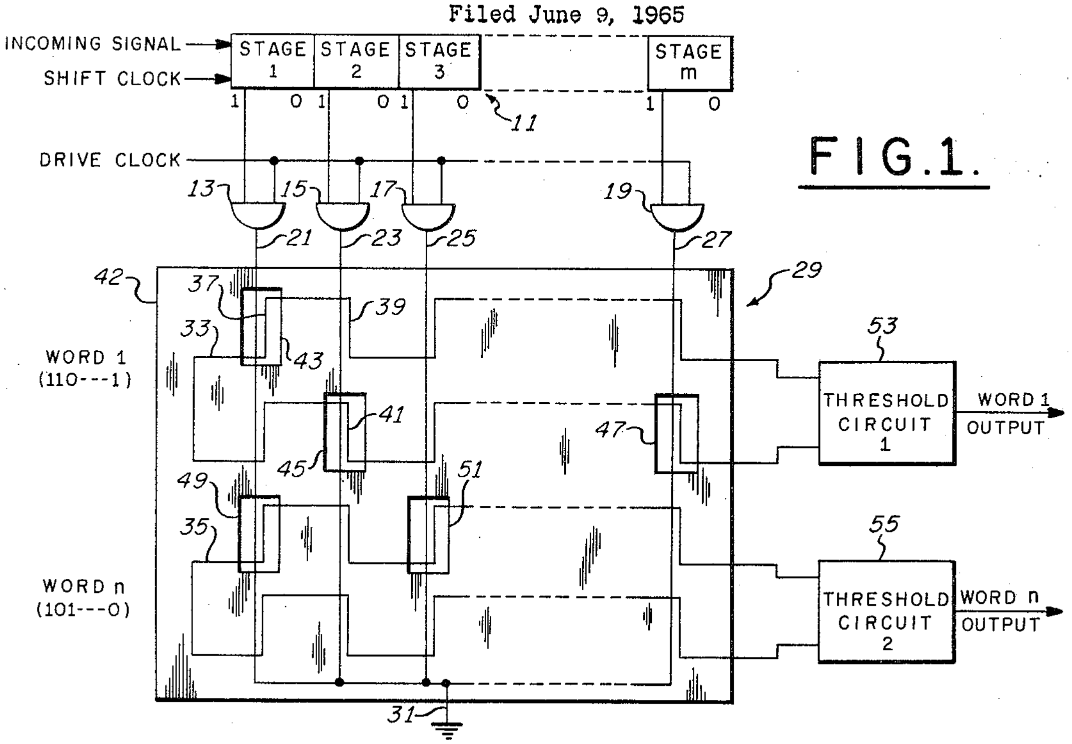
FIG. 1 is a schematic diagram of a circuit employing the invention.

In FIG. 1, an $m$-stage shift register 11 is used to receive incoming digital signals. These signals may be received in digital form and applied directly to the shift register. If the received signals are received in analogue form they may be converted to digital form by well-known techniques and then applied to the correlator.

The incoming signal is shifted step-by-step down the shift register by means of a train of shift clock pulses according to well-known techniques.

A plurality of AND gates 13, 15, 17, and 19 receive the binary ONE output signals from the respective stages of the shift register. Drive clock signals are also applied to each of the AND gates.

The drive clock signals and the shift clock signals are timed so as to be in alternate relationship. Thus the information can be read out of the shift register 11 and into the respective drive lines 21, 23, 25, and 27 after each shift of information in the register. Each drive line continues through the entire coded memory unit 29 and is connected to a common ground point 31.

The coded memory of FIG. 1 contains a pair of sense lines 33 and 35. These sense lines are inductively coupled to each of the drive lines by means of short segments such as the segments 37, 39 and 41 running parallel to the respective drive lines. Any drive signal appearing in a drive line thus is inductively coupled to the various sense lines. The drive lines are furthermore coupled additively to a given sense line so that the total voltage produced throughout a given sense line is the sum of the net voltage increments induced in that line.

An electrically conducting memory card 42 is placed in a plane below the drive lines and the sense lines. In practice, this memory card may be formed from an ordinary data processing card supplied with a suitable non-magnetic metallic coating.

The rectangular areas 43, 45, 47 49 and 51 represent apertures punched in the memory card at those bit positions at which a binary ONE is to be stored. A pulse of drive current at these bit positions induces an E.M.F. in the adjacent sense wire. Since the metallic memory card does not extend into these areas, only comparatively small eddy currents are produced in the card. These small eddy currents, in turn, produce only feeble counter E.M.F.'s in the sense wire so that a net voltage increment is produced in the sense wire.

At the bit positions storing a binary ZERO, however, the metallic card extends into the region in which the drive line and sense wire are inductively coupled. At these positions, the drive pulse currents induce comparatively strong eddy currents in the nearby metallic memory card. Since the memory card is closely coupled to the sense wire, these eddy currents can induce a counter E.M.F. of such magnitude in the sense wire that the directly induced E.M.F. is substantially nullified. In effect, the memory card decouples the drive line and sense wire at these bit positions.

Thus in FIG. 1, word 1 represents the coded word 110---1 whereas word $n$ represents the coded word 101---0.

The output of the sense line 33 is applied to a threshold circuit 53. The threshold circuit is adjusted so as to produce a word 1 output signal whenever a voltage in excess of a predetermined minimum is induced in the sense line. Thus, for example, the threshold circuit 53 might be adjusted so that if a voltage were induced in the sense line 33 at the positions 37, 41 and 47, a word output signal would be produced by the threshold circuit, but if voltages were induced in the sense line only on the bit positions 37 and 41, no word output signal would be produced.

A second threshold circuit 55 is provided in the output of the sense line 35.

Figure 2:
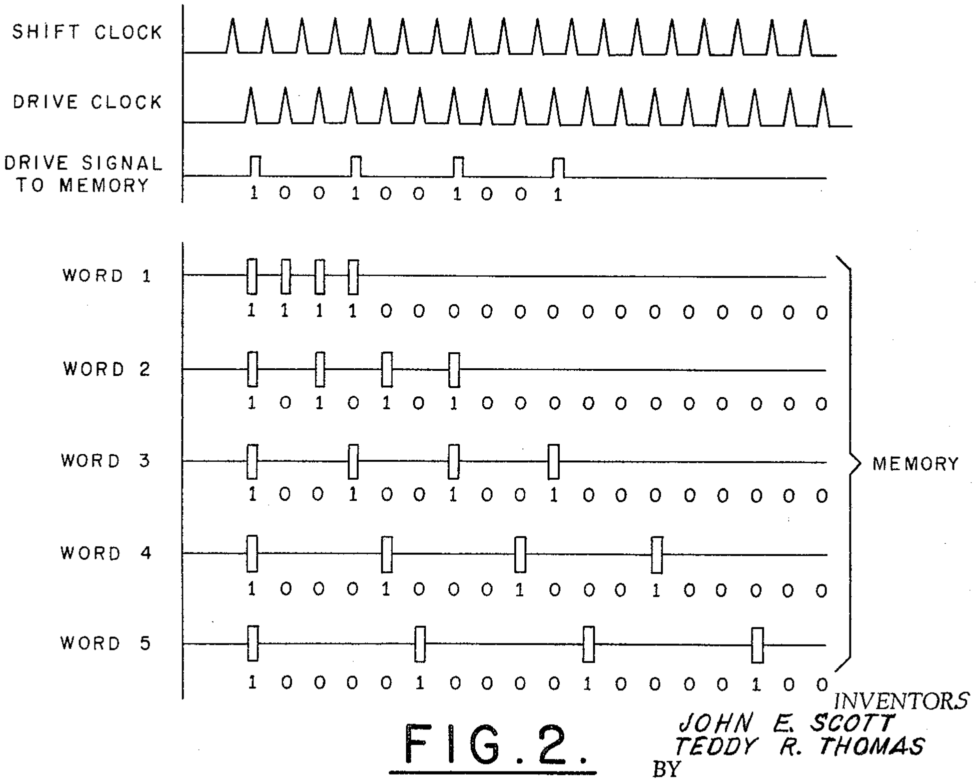
FIG. 2 is a diagram useful in explaining the operation of the invention.

Operation of the device may be understood by referring to the diagram of FIG. 2 together with the circuit diagram of FIG. 1.

The diagram of FIG. 2 depicts a train of shift clock pulses alternating with a train of drive clock pulses and represents the conditions obtaining when the incoming word is represented as 1001001001. The diagram indicates that five words are stored in the memory. Binary ONE positions in each word are represented as rectangular areas in the memory portion of the diagram for ease of understanding.

The input signal is shifted digit by digit down the register in response to the shift clock pulses. Information is sampled in each register stage after each shift by means of the drive clock pulses. These clock pulses produce drive signals at those register stages containing a binary ONE. When the entire incoming word reaches the position indicated in the figure, a drive pulse from each stage in the shift register containing a binary ONE will coincide with the binary ONE bit positions in the word 3 of the memory. This will produce a total voltage of four units at the input of the associated threshold circuit. No other word in the memory will produce a voltage of this magnitude prior to the time that the incoming word reaches the position indicated. If the threshold circuits were set to produce a word output signal only when more than three units of voltage had been induced into a given sense line, a word output signal would be produced at one of the threshold circuits whenever the spacing between digits of the incoming word coincided with the spacing of one of the stored words.

The various words entered into the memory can be designed to represent a given signal and predetermined variations of that given signal. For instance, if the correlator were to be used in a pulse compression radar environment, a signal equivalent to the coded word 3 might be transmitted. If this signal were returned from a stationary target, the spacing between the pulses would be undisturbed. The received signal would still be represented by the code of word 3. If, however, the target were moving directly away from the radar, the signal would experience a Doppler shift and the spacing between pulses would be increased. The return signal might then appear similar to word 4 or word 5. On the other hand, if the target were approaching the radar, the resultant Doppler shift would cause the spacing between pulse to be decreased and the received signal might appear as word 2 or word 1, depending upon the speed of the target.

The elapsed time between the transmitted and received signals would still represent the range of the target.

The circuit of the invention is particularly useful in data transmission applications wherein the transmitted signals may be altered by noise. The coded words to be expected are entered in the memory unit. The circuit will then correlate the noisy received signals with all of the words in the memory and yield an output for any word or words whose correlation to the received signal exceeds the threshold setting.

Even though the incoming signal may be degraded by noise, its correlation to the corresponding word in the memory will be greater than its correlation to other words in the memory. The threshold may be set at a level considerably below the level for a perfect match but higher than the amplitude of the random noise or uncorrelated signals. Thus, the signal can be identified so long as its correlation to the stored word exceeds some minimum value.

It will be appreciated that the circuit of FIG. 1 has been depicted as having only a few shift register stages and only a two word memory in order to facilitate understanding of the invention. In a practical situation, a large number of words would be stored in the memory and a code word having a large number of digits would be employed. In one proposed radar application, 80 bit words can be employed and 12 Doppler channels are available.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A stored data correlator comprising a shift register to receive an incoming word to be processed; means to produce individual drive signals corresponding to each binary ONE and only to each binary ONE in the incoming word; a coded memory to store a group of binary coded words; a single column of bit positions in said memory corresponding to each stage in the shift register; means to apply each of said drive signals to the corresponding column of bit positions; means responsive to a drive signal to produce a sense voltage pulse at any bit position at which a binary ONE is stored; means to add concurrent sense voltage pulses produced at the bit positions corresponding to a given stored word; and means to produce a word output signal when the sum of the sense voltage pulses exceeds a predetermined minimum.

2. A stored data correlator comprising a shift register to receive the individual digits of an incoming word to be processed; means to interrogate said register after each digit is shifted into the register; means responsive to the interrogation means to produce individual drive signals corresponding to each binary ONE stored in the register; a coded memory to store a group of binary coded words; a column of bit positions in said memory corresponding to each stage in the shift register; a row of bit positions in said memory corresponding to each binary word to be stored; individual drive lines connected to transmit drive signals from each stage of the shift register to the corresponding column in the coded memory; an individual sense line for each row in the coded memory, each of said sense lines being inductively coupled to each drive line at a unique bit position; means to decouple said sense line from said drive line at any bit position in which the stored word contains a binary ZERO; means to add the individual voltages induced in a sense line in response to a drive signal; and means to pass a word output signal whenever the sum of the voltages induced in a sense line exceeds a predetermined minimum.

3. A comparator comprising an $m$-stage shift register; means to enter a binary coded word serially into said shift register; means to produce a plurality of drive signals corresponding to each stage of the shift register containing a binary ONE after each shift of information in the register; a memory for storing $n$ $m$-bit words; conducting means to apply a drive signal to each bit position in the memory corresponding to the register stage providing the drive signal; a plurality of $n$ sense lines, each sense line being inductively coupled to the individual conducting means at each bit position corresponding to a given stored word; each of said sense lines further being coupled to the various conducting means in an additive relationship; and individual threshold circuits connected to each sense line to provide a word output signal when the sum of the voltages induced in the sense lines exceeds a threshold value.

4. A comparator comprising a shift register to receive an incoming binary coded word; means to interrogate said register after each digit of the incoming word is shifted into the register; means responsive to said interrogation means to produce simultaneous drive signals corresponding to each stage of the shift register containing a binary ONE; a memory for storing a variety of binary coded words; a column of bit positions in said memory corresponding to each stage in said register; a row of bit positions in said memory for each word to be stored; means to apply a drive signal to each bit position in a given column, a sense line inductively coupled to each bit position in a given row so as to produce additive incremental voltages in response to a plurality of drive signals; means for magnetically shielding a sense line from the field of a drive signal at those bit position at which a binary ZERO is to be stored; and threshold means to provide an output signal when the sum of the voltages induced in a sense line exceeds a predetermined threshold.

5. A comparator comprising a shift register to receive an incoming binary coded word; means to produce simultaneous drive signals corresponding to each stage and only each stage of the shift register containing a binary ONE; a memory for storing a variety of binary coded words, said memory containing a single column of bit positions corresponding to each stage in said register; drive means to apply each drive signal to all of the bit positions in the corresponding memory column; individual sense lines corresponding to each word stored in the memory, each of said sense lines being inductively coupled in an additive fashion to each of said drive lines at a unique bit position; means to decouple the sense lines from the drive lines at those bit positions at which a binary ZERO is to be stored; and individual threshold means connected to each sense line whereby an output signal is produced whenever the signal coupled into the sense line exceeds the threshold value.

6. A comparator comprising a shift register to receive individual digits of an incoming word to be processed; means for sampling the information in the shift register after each digit of an incoming word is shifted into the register; means to produce a drive signal at each stage and only at each stage of the shift register containing a binary ONE at the time that the information is sampled; a memory for storing a variety of digitally coded words, said memory having a single column of bit positions corresponding to each register stage; means to apply a drive signal to each column corresponding to the register stage producing the drive signal; means to produce an incremental sense voltage at each bit position that is storing a binary ONE when exposed to a drive signal; means to add the incremental sense voltages corresponding to each word in the memory; and means to produce a word output signal whenever the sum of the incremental voltages corresponding to a given stored word exceeds a predetermined minimum value.

7. A comparator comprising a shift register to receive an incoming binary coded word; means to produce simultaneous drive signals corresponding to each stage and only each stage of the shift register containing a binary ONE; a memory for storing a variety of binary coded words, said memory containing one and only one column of bit positions corresponding to each stage in said register; drive means to apply each drive signal to all of the bit positions in the corresponding memory column; individual sense lines corresponding to each word stored in the memory, each of said sense lines being additively coupled to each of the drive means; means to decouple the sense lines from the drive lines at those bit positions at which a binary ZERO is to be stored; and individual threshold means connected to each sense line whereby an output signal is produced whenever the signal coupled into the sense line exceeds the threshold value.

8. A comparator comprising a shift register to receive individual digits of an incoming word to be processed; means for sampling the information in the shift register after each digit in the incoming word is shifted into the register; means responsive to said sampling means to produce a drive signal at each stage and only at each stage of the shift register containing a binary ONE; a memory for storing a variety of digitally coded words; a plurality of bit positons in said memory; individual sense lines in said memory for each word to be stored; individual conducting means to conduct each drive signal to the memory; each of said conducting means being inductively coupled in additive fashion to each of said lines at a unique bit position; said sense lines and said conducting means further being arranged in discrete planes; a conductive card arranged to be inserted between the planes of the conducting means and the sense lines, said card containing apertures spaced to coincide with those bit positions at which a binary ONE is to be stored when the card is fully inserted; and individual threshold means connected to each sense line, said threshold means being adjusted to provide an output signal when the sum of the voltages induced in the line exceeds a predetermined value.

9. In combination: a shift register; means to provide a drive signal at the output of each and only at each stage of the shift register that contains a binary ONE; a coded memory; an array of bit positions in said coded memory, said bit positions being arranged in rows and columns, said columns being equal in number to the number of stages in said shift register; individual drive lines connecting all of the bit positions in each column; a source of sampling pulses; means responsive to said sampling pulses to energize an individual drive line with a drive signal from the corresponding stage of the shift register, whereby a current flows through those bit positions corresponding to a shift register stage containing a binary ONE whenever a sampling pulse occurs; individual sense lines, each sense line being coupled additively to all of the bit positions in a given row; means to decouple selected bit positions from the associated sense wire, whereby binary coded words may be entered in each row of bit positions by decoupling those positions corresponding to a binary ZERO; and threshold means coupled to the output of each sense line, said threshold means being adjusted to pass only signals greater than a predetermined value.

References Cited

UNITED STATES PATENTS

| | | | |
|---|---|---|---|
| 3,130,388 | 4/1964 | Renard | 340—173 |
| 3,239,832 | 3/1966 | Renard | 340—347 |

MALCOLM A. MORRISON, *Primary Examiner.*

K. F. MILDE, V. SIBER, *Assistant Examiners.*